(12) United States Patent
Brown et al.

(10) Patent No.: US 7,849,209 B2
(45) Date of Patent: *Dec. 7, 2010

(54) SYSTEM AND METHOD FOR LINK RATE NEGOTIATION

(75) Inventors: Matthew Brown, Kinburn (CA); Marika Herod, Ottawa (CA); Yanming Gao, Kanata (CA)

(73) Assignee: Applied Micro Circuits Corporation, San Diego, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/236,918

(22) Filed: Sep. 24, 2008

(65) Prior Publication Data

US 2010/0075613 A1   Mar. 25, 2010

(51) Int. Cl.
*G06F 15/16* (2006.01)
(52) U.S. Cl. .................. 709/233; 709/230; 709/232; 709/238; 370/537
(58) Field of Classification Search ......... 709/230–238; 370/537
See application file for complete search history.

(56) References Cited

U.S. PATENT DOCUMENTS

| | | | |
|---|---|---|---|
| 2002/0118412 A1* | 8/2002 | Gibson et al. ............... | 359/118 |
| 2002/0130795 A1* | 9/2002 | Moon ........................... | 341/61 |
| 2002/0146043 A1* | 10/2002 | McRobert et al. ........... | 370/537 |
| 2003/0078010 A1* | 4/2003 | Davis .......................... | 455/69 |
| 2004/0208180 A1* | 10/2004 | Light et al. ............... | 370/395.2 |
| 2005/0165959 A1* | 7/2005 | Huff ........................... | 709/238 |
| 2005/0198260 A1* | 9/2005 | Shahdadpuri et al. ....... | 709/224 |

* cited by examiner

*Primary Examiner*—Wing F Chan
*Assistant Examiner*—Razu A Miah
(74) *Attorney, Agent, or Firm*—Law Office of Gerald Maliszewski; Gerald Maliszewski

(57) ABSTRACT

A system and method are provided for negotiating a link data rate in a communication system using a plurality of data rates. In a system including a first device network-connected to a second device, auto-negotiation (AN) messages are mutually transmitted. The AN messages indicate rate information such as preferred data rate capabilities, if the device has a dual-rate capability, or a single data rate capabilities. If the AN messages are mutually transmitted, a negotiated link data rate is established. However, if one of the devices cannot send AN messages, the other device times-out, and a link data rate is established at the data rate transmitted by the device that is not AN-capable.

20 Claims, 9 Drawing Sheets

| Bits A0A1A2 | Rate |
|---|---|
| 0x0 | no rate supported |
| 0x1 | only 1G supported |
| 1x0 | only 10G supported |
| 101 | both rates supported, 10G preferred |
| 111 | both rates supported, 1G preferred | x indicates do not care

FIG. 6

| Bit(s) | Name | Description | RO[a] |
|---|---|---|---|
| 7.48.15:4 | Reserved | Ignore on read | RO |
| 7.48.4 | 10GBASE-KR FEC negotiated | 1 = PMA/PMD is negotiated to perform 10GBASE-KR FEC<br>0 = PMA/PMD is not negotiated to perform 10GBASE-KR FEC | RO |
| 7.48.3 | 10GBASE-KR | 1 = PMA/PMD is negotiated to perform 10GBASE-KR<br>0 = PMA/PMD is not negotiated to perform 10GBASE-KR | RO |
| 7.48.2 | 10GBASE-KX4 | 1 = PMA/PMD is negotiated to perform 10GBASE-KX4<br>0 = PMA/PMD is not negotiated to perform 10GBASE-KX4 | RO |
| 7.48.1 | 1000BASE-KX | 1 = PMA/PMD is negotiated to perform 1000BASE-KX<br>0 = PMA/PMD is not negotiated to perform 1000BASE-KX | RO |
| 7.48.0 | BP AN ability | If a 1000BASE-KX, 10GBASE-KX4 or 10GBASE-KR PHY type is implemented, this bit is set to 1 | RO |

[a]RO = Read Only

FIG. 7
(Prior Art)

Rate Negotiation Arbitration

| Local Advertised Capability A0/A1/A2 | Received Advertised Capability A0/A1/A2 | Negotiated Rate | Negotiated Rate MDIO 7.48.3:1 |
|---|---|---|---|
| 111 - prefer 1G | 111 - prefer 1G | 1G | 001b |
| | 101 - prefer 10G | 1G | 001b |
| | 100 - 1G only | 1G | 001b |
| | 001 - 10G only | 10G | 100b |
| | 1G parallel | 1G | 001b |
| | 10G parallel | 10G | 100b |
| 101 prefer 10G | 111 - prefer 1G | 1G | 001b |
| | 101 - prefer 10G | 10G | 100b |
| | 100 - 1G only | 1G | 001b |
| | 001 - 10G only | 10G | 100b |
| | 1G parallel | 1G | 001b |
| | 10G parallel | 10G | 100b |
| 100 - 1G only | 111 - prefer 1G | 1G | 001b |
| | 101 - prefer 10G | 1G | 001b |
| | 100 - 1G only | 1G | 001b |
| | 001 - 10G only | mismatch | 000b |
| | 1G parallel | 1G | 001b |
| | 10G parallel | mismatch | 000b |
| 001 - 10G only | 111 - prefer 1G | 10G | 001b |
| | 101 - prefer 10G | 10G | 001b |
| | 100 - 1G only | mismatch | 000b |
| | 001 - 10G only | 10G | 001b |
| | 1G parallel | mismatch | 000b |
| | 10G parallel | 10G | 001b |

FIG. 8

SYSTEM AND METHOD FOR LINK RATE NEGOTIATION

BACKGROUND OF THE INVENTION

1. Field of the Invention

This invention generally relates to communication systems and, more particularly, to a system and method for negotiating a link rate in a communication system where link partners are optionally capable of transferring at two or more data rates.

2. Description of the Related Art

FIG. 1 is an auto-negotiation and training state diagram for an IEEE 802.3ap compliant network (prior art). The diagram is a state machine demonstrating the steps in an auto-negotiation (AN) process between boards across a backplane. Devices in such a backplane may be capable of operating at 1 gigabits per second (1 G), 10 G, and both 1 G and 10 G. Further, some units are able to send AN pages, compliant with Clause 73 of 802.3ap, to negotiate a data rate. Following power-up, reset, link fault, or time-out (100) the driver is disabled for a pre-determined period of time, which forces the link partner to restart. Next, the driver sends AN pages and the receiver looks for AN pages (102). If AN pages are detected, then the rate is negotiated based on local and received abilities.

If AN pages are not detected, then the Rx looks for a 1 G signal (104). If a 1 G signal is detected or negotiated, then the data path is configured for 1 G and 1 G acquisition begins (106). If 1 G cannot be detected, the receiver looks for a 10 G signal. If 10 G is negotiated, then the data path is configured for 10 G training and 10 G training begins (110). When 1 G acquisition or 10 G training is complete, the data path is configured for 1 G or 10 G, tracking and data transmission may begin at steps 108 and 112, respectively.

If 100 training does not complete within 500 ms, or if 1 G acquisition does not complete within 50 ms, or if a fault is detected while training, tracking, or acquiring, AN will restart (100).

It would be advantageous if a streamlined process of AN were developed that could account for devices capable of AN, dual-rate devices without AN capacity, and single-rate devices.

SUMMARY OF THE INVENTION

Disclosed herein are a system and method, that permits physical layer devices (PHY) to negotiate rates over copper cable or optical links. With a compliant link partner, a rate can be selected at one end to match, throughput requirements. The 1 G is more power conservative, and is useful when network throughput requirement are low. However, the 10 G is desirable when high throughput is required. The disclosed system automatically links partners with different link preferences, even if the link partners do not have an AN capability. Optionally, training for 10 G links may be supported to optimize performance, especially with highly dispersive, high loss cables.

As is conventional, AN pages are sent to, and received by compliant link partners. Through these AN pages the rate and, potentially, other features such as FEC and pause control may be negotiated. By enabling 1 G rate and disabling 10 G rate, the link, rate may be configured to be 1 G from either end. By enabling both 1 G and 10 G rate, the link partner may control the link rate. With a non-compliant fixed rate link partner, the fixed rate is detected and the data path is appropriately configured. If a 10 G signal is detected, the data path is configured for 10 G. If a 1 G signal is detected, the data path is configured for 1 G.

Accordingly, a method is provided, for negotiating a link data rate in a communication system using a plurality of data rates. In a system including a first device network-connected to a second device, auto-negotiation (AN) messages are mutually transmitted. The AN messages indicate rate information such as preferred data rate capabilities, if the device has a dual-rate capability, or a single data rate capabilities. If the AN messages are mutually transmitted, a negotiated link data rate is established. However, if one of the devices cannot send AN messages, the other device times-out, and a link data rate is established at the data rate transmitted by the device that is not AN-capable.

If only one of the devices is capable of transmitting at two data rates, a link data rate is established at a data rate common to both devices. If both of the devices are capable of transmitting at two data rates and the devices have different preferred data rates, a link data rate is established at a system default preferred data rate.

Additional details of the above-described method and, a system for negotiating a link data rate in a communication system using a plurality of data rates, are provided below.

BRIEF DESCRIPTION OF THE DRAWINGS

FIG. 6 is a table summarizing exemplary rate negotiation criteria.

FIG. 7 is a table illustrating an example of how the negotiated rate may be indicated using the negotiated rate bits in the Backplane Ethernet Status register (7.48) (prior art).

FIG. 8 is a table summarizing the expected negotiated rate; based on the criteria set at each PHY, along with the actual negotiated rate result.

DETAILED DESCRIPTION

Figure 1:
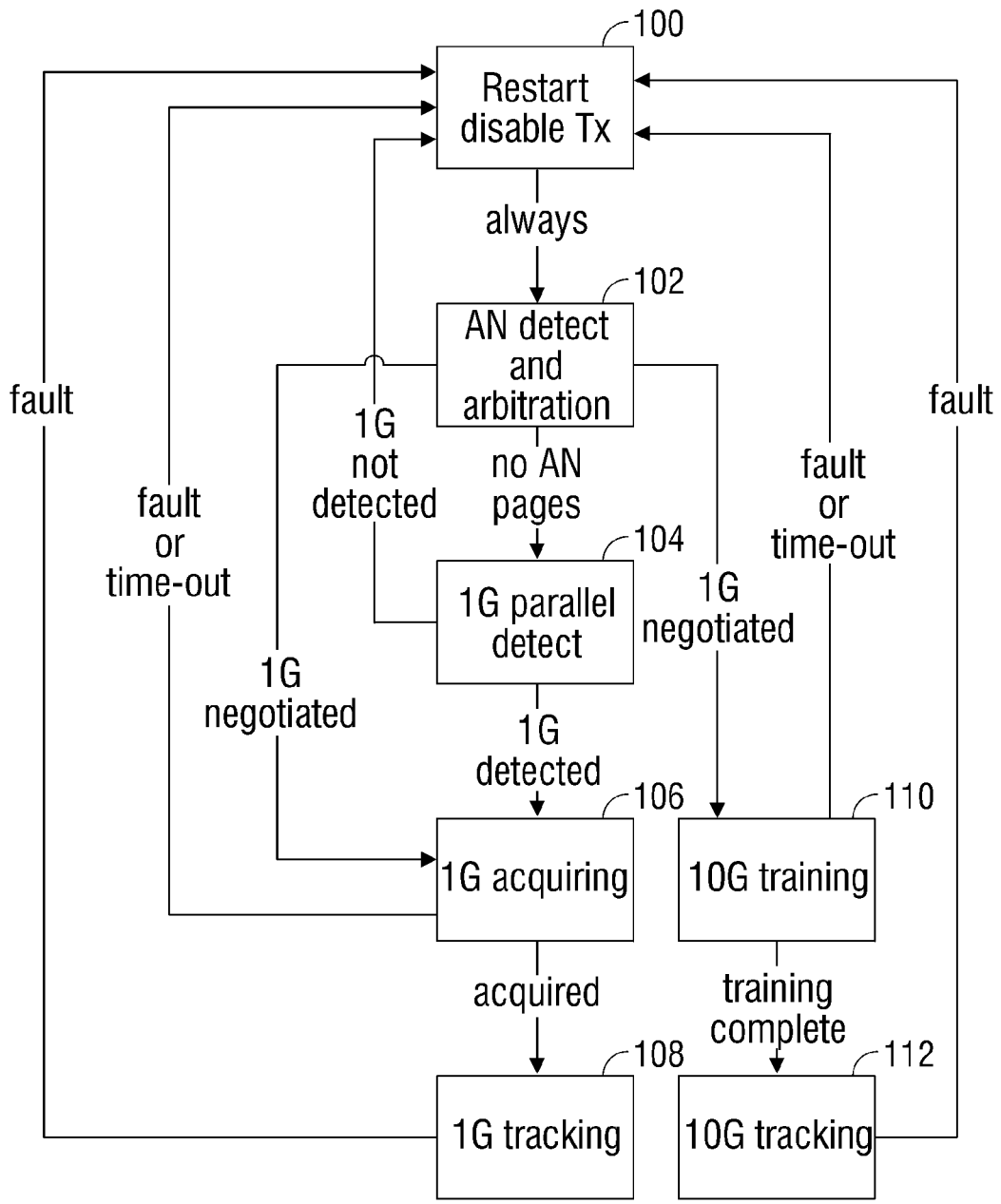
FIG. 1 is an auto-negotiation and training state diagram for an IEEE 802.3ap compliant network (prior art).
Figure 2:
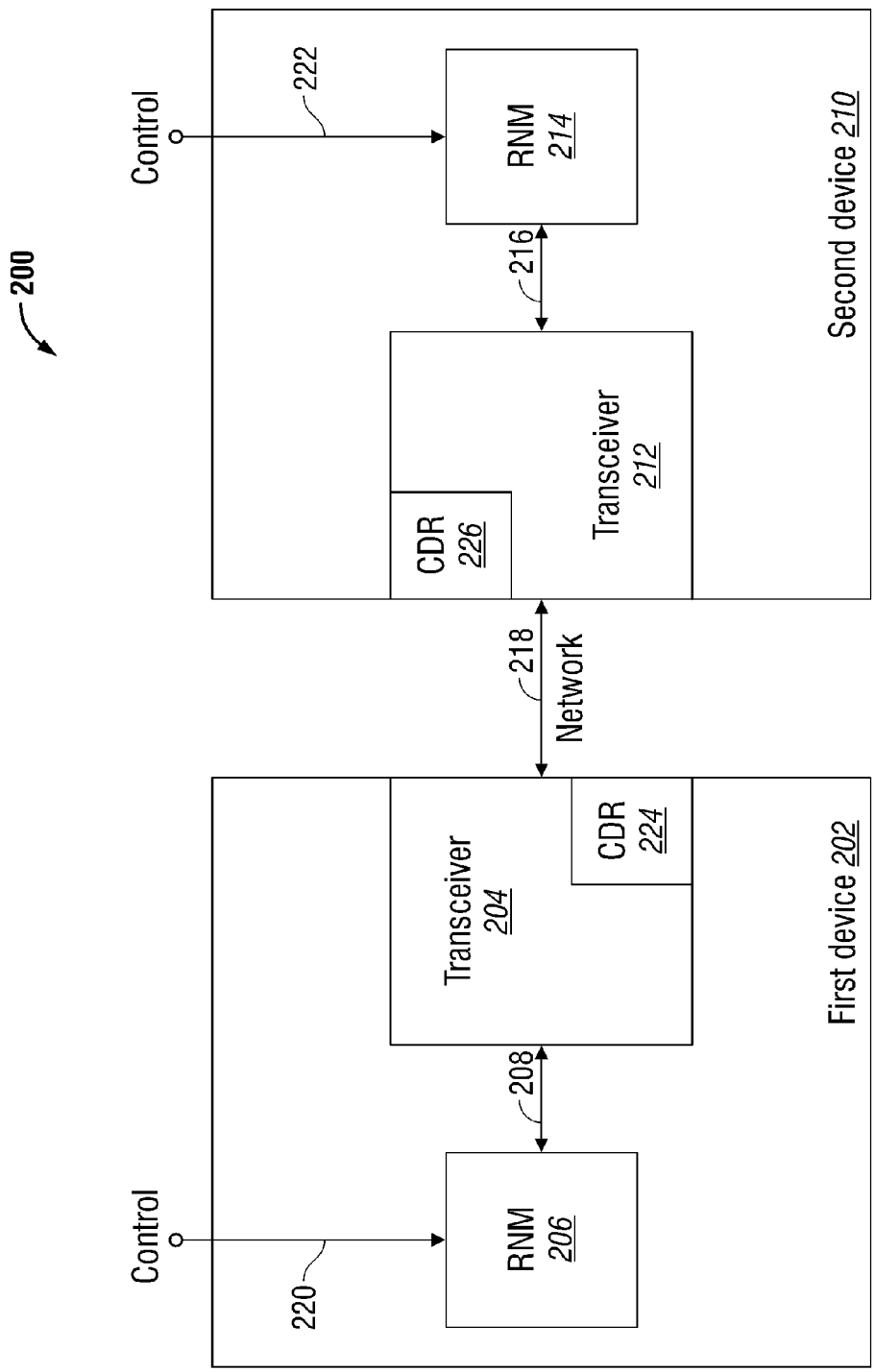
FIG. 2 is a schematic block diagram of a system for negotiating a link data rate in a communication network using a plurality of data rates.

FIG. 2 is a schematic block diagram of a system, for negotiating a link data rate in a communication network using a plurality of data rates. The system 200 comprises a first device 202 with a transceiver 204 interfaced to a rate negotiation module 206 on line 208. A second device 210 has a transceiver 212, interfaced to a rate negotiation module 214 on line 216, and is network-connected to the first device transceiver on line 218. The rate negotiation module (RNM) 208 of the first device 202 and the RNM 214 of rate second device 210 mutually order the transmission of predetermined inquiry signals in the event, that a negotiated data rate has not been determined.

In one scenario, the first device 202 transmits the inquiry signal at a first data rate and the second device transmits the inquiry signal at a second data rate. There are two typical results for this scenario. In one result, the first and second device rate negotiation modules 206/214 order the transmission of non-predetermined data at, the second data rate—if the second device receives an acknowledgement signal from the first device at the second data rate. Otherwise, the first and second device rate negotiation modules 206/214 order the transmission of non-predetermined data at the first data rate in the event of the first device receives an acknowledgement signal from the second device at the first data rate. In the event that the devices have single-rate capabilities at different frequencies, communication is not possible. Other circumstances where neither the first nor second device receive a response at the expected data, rate are presented below.

In one aspect, non-predetermined Ethernet data at a first data rate may be transmitted at 10 gigabit per second (10 G) and at the second data rate may be transmitted at 1 G. It should be understood that the actual data rates may be higher than 1 G and 10 G to line coding, e.g., 8B/10B for 1 G and 64B/66B for 10 G. It should also be understood however, that the system is not necessarily limited to any particular message protocol or data rate.

In one aspect, the first: device transceiver 204 includes a clock and data recovery (CDR) system 224, and the second device transceiver includes clock and data recovery system 226. The first and second device transceivers fail to receive an acknowledgement signal, or any oilier kind of transmission. If the CDR systems fall to lock to received signals. The device transceivers successfully receive acknowledgement signals in response to the CDR systems locking on received signals.

In one aspect, the rate negotiation modules 208/214 of the first and second devices order the transmission of non-predetermined data at the first rate in response to the following circumstances—the second device is capable of transceiving at the first and second data rates, hut the first device is only capable of transmitting (and receiving) at the first data rate. Since the second device does not receive an acknowledgement signal at the second data rate from the first device, the second device times-out, and after the time-out, transmits at the first data rate, in response to detecting a signal at the first data rate.

Likewise, if the first device is capable of transmitting at the first and second data rates, and the second device is only capable of transmitting at the second data rate, the rate negotiation modules 206/214 order the transmission of non-predetermined data at the second data rate in response to the first device timing-out after not receiving an acknowledgement signal at the first data rate from a second device, and then detecting signals at the second data rate.

In a second scenario, which typically occurs prior to the mutually transmission of inquiry signals described above in the first scenario, the rate negotiation module 208 of the first device, orders the transmission an AN message indicating rate information such as preferred data rate capabilities, if the first device has a dual-rate capability, or single data rate capabilities. The result of this scenario is that the rate negotiation modules 206/214 of the first and second devices mutually order the transmission of inquiry signals in response to the first-device not receiving an AN message from the second device.

In an alternative result to the second scenario, the rate negotiation module of the first device times-out because an AN message has been, received from the second device, and after the time-out, the first and second, devices transmit at the second data rate.

In a third scenario, which typically occurs prior to mutually transmitting inquiry signals in the first scenario, the rate negotiation modules 208/214 of the first and second devices, mutually order the transmission of AN, which as mentioned above, indicating rate information such as preferred data rate capabilities and single data rate capabilities. In this scenario, the rate negotiation modules of each device unilaterally determine a common negotiated rate from evaluating their own data rate capabilities and received rate capabilities. Then, the first and second devices 202/210 mutually receive AN replies indicating a successful negotiation, and the rate negotiation modules 208/214 order the transmission of non-predetermined data at the negotiated data rate.

In one aspect, the first and second devices transmit AN messages in accordance with either an IEEE 802.3ap Clause 73 protocol or an 802.3 Clause 37 protocol, and further include a message indicating compatibility with a proprietary negotiation protocol. For example, the proprietary protocol may include all, or some of the elements of the system 200 described, herein. Then, the first and second, devices receive AN replies indicating compliance with the proprietary negotiation protocol.

In a fourth scenario, the first and second device transceivers 204/212 are capable of transceiving at both the first and second data rates. The first device rate negotiation module 206 has a control interface on line 220 for selecting the first data rate preference, and the second device rate negotiation module 214 has a control interface on line 222 for selecting the second data rate preference. The rate negotiation modules 206/214: of the first and second devices order the transmission of non-predetermined data at the second rate in response to the first device timing-out before the second device. Timing-out is defined as not receiving an expected transmission within a predetermined duration of time.

Because of the time-out, the preference of the second device becomes data rate that is used. Thus, the time-outs can be used to select a default data rate in the event of competing preferences. For example, a first time-out duration may be associated with the first data rate, and a second time-out duration, associated with a system default rate, greater than the first time-out duration, may be associated with the second data rate. In one aspect, the default data rate is a system default rate, and the first and second durations are system-wide values that are shared in common by all the link partners.

In the fourth scenario, the rate negotiation modules 206/214 of the first and second devices order the transmission of non-predetermined data at the second rate in response to the first device timing-out before the second device.

In a fifth scenario, the first device 202 disables further transmissions for a predetermined period of time in response to a device reset or management intervention message received at the control interface on line 220. As a result, the rate negotiation module 214 of the second device orders the restarting and disabling transmissions for a pre-determined duration of time in response to the lack of received transmissions from the first device. Then, the rate negotiation modules 206/214 mutually order the transmission of inquiry signals, following the restart, if a negotiated data rate has not been determined.

The RNMs 206 and 214 may be enabled in hardware using logic circuitry or programmable gate arrays. The RNMs may also be enabled as processor software instructions stored as an application in memory (not shown), and executed by a processor (not shown). Alternately, the RNMs may be enabled as a combination of hardware and software.

Functional Description

Figure 3:
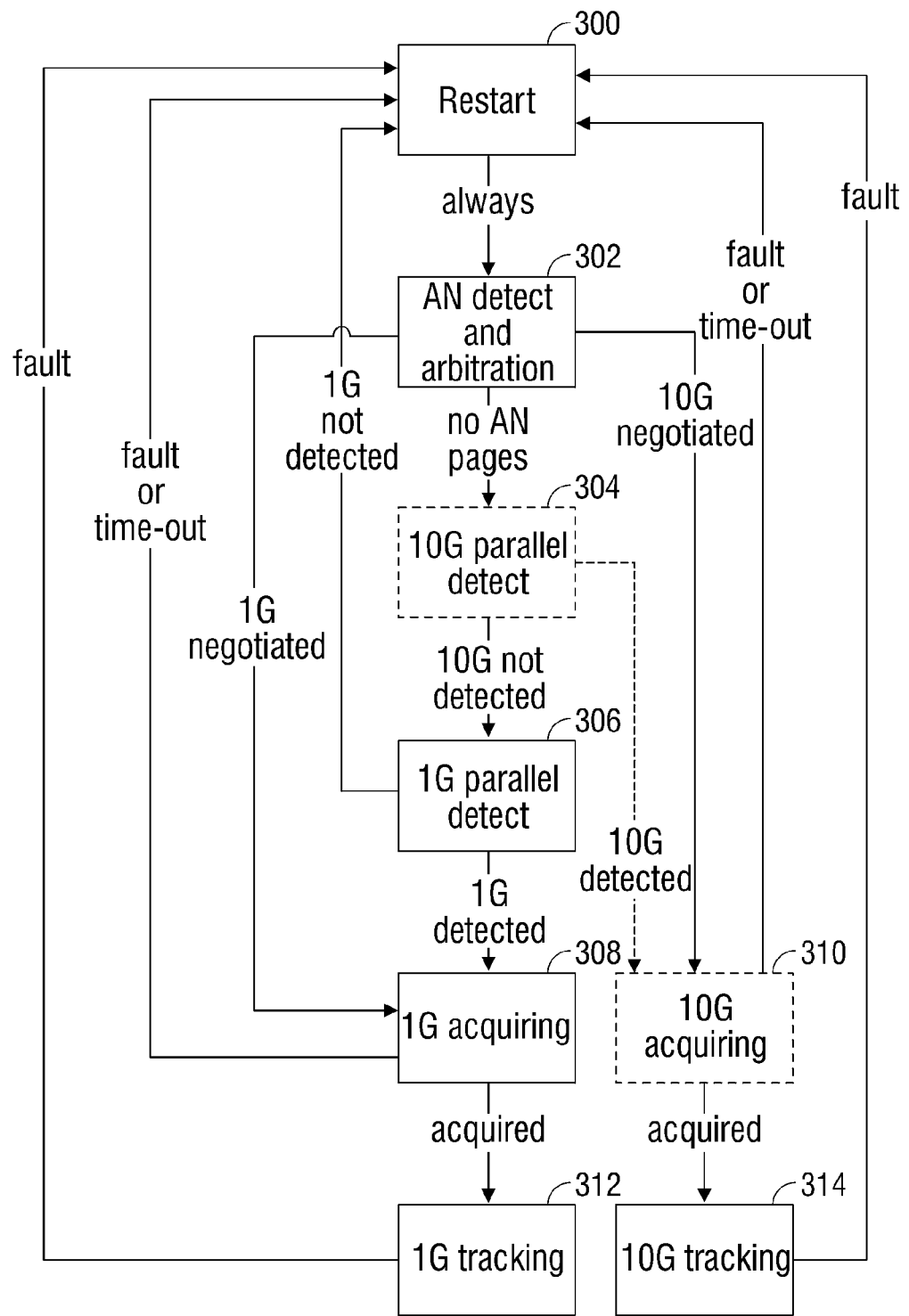
FIG. 3 is a state diagram for a universal auto-negotiation network with fixed or inferred Tx tap settings.

FIG. 3 is a state diagram for a universal auto-negotiation network with fixed or inferred Tx tap settings. Following power-up, reset, link fault, or time-out (300) the driver is disabled for a predetermined period of time to force the link partner to restart. Next, the driver sends AN pages and the receiver looks for AN pages (302). If AN pages are detected, then the rate is negotiated based on local and received abilities. If AN pages are not detected, then the Rx looks for a 10 G signal (304). If a 10 G signal is not detected, then the Rx looks for a 1 G signal (306). The driver continues to send AN pages until a rate is determined or AN is restarted. In parallel with Step 304, if a 1 G signal is detected or negotiated (306), then the data paths are configured, for 1 G and 1 G acquisition begins (308).

If a 10 G signal is detected or negotiated (304), then the data paths are configured for 10 G and 10 G acquisition begins (310). When 1 G or 10 G acquisition is complete, the data path is configured for 1 G or 10 G (312 and 314, respectively), and tracking and data transmission begins.

If 10 G acquisition does not complete within a predetermined period of time, or if 1 G acquisition does not complete within a predetermined period of time, or if a fault is detected while tracking or acquiring, AN starts all over again (300).

Figure 4:
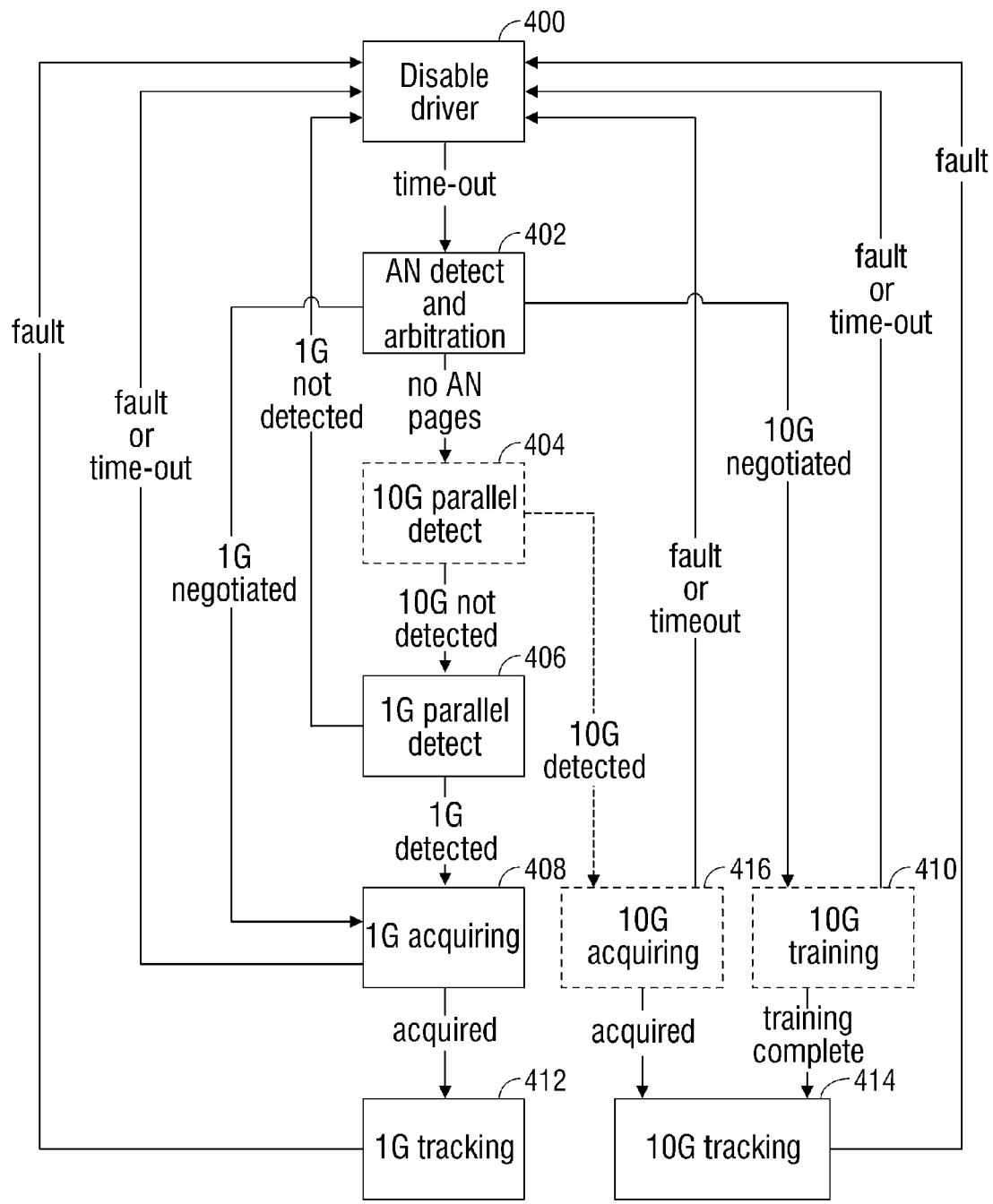
FIG. 4 is a state diagram for a universal auto-negotiation network with Tx tap training based upon IEEE 802.3 Clause 72.

FIG. 4 is a state diagram for a universal auto-negotiation network with Tx tap training based upon IEEE 802.3 Clause 72. This state machine demonstrates the steps Involved when Tx training is required. Following power-up, reset, link fault, or time-out (400) the driver is disabled for a predetermined period of time to force the link partner to restart. Next, the driver sends AN pages and the receiver looks for AN pages (402). If AN pages are detected, then the rate is negotiated based on local and received abilities. If AN pages are not detected, then the Rx looks for a 10 G signal in the 10 GBASE-R format (404). If a 10 G signal is not detected, then the Rx looks for a 1 G signal in 8B/10B format (406). If the 10 G rate is negotiated, then the data path is configured for 10 G training, and 10 G training begins (410). If a 10 G signal is detected, then the data path is configured for 10 G and 10 G acquisition begins (416). If a 1 G signal is detected or negotiated, then the data path is configured for 1 G and 1 G acquisition begins (408).

When 1 G acquisition (408) is complete, the data path is configured for 1 G tracking (412) and data transmission may begin. When 10 G acquisition (416) or 10 G training (410) is complete, the data path is configured, for 10 G tracking (414) and data transmission may begin.

If 10 G training (410) does not complete within a predetermined period of time, if 10 G acquisition (416) does not complete within a predetermined period of time, if 1 G acquisition (408) does not complete within a predetermined period of time, or if a fault is detected while training, tracking, or acquiring, AN will start all over again (400). If 10 G training is not supported, the process goes from Step 404 to 10 G acquisition (416), as in FIG. 3.

It is possible to negotiate a link rate without the need for Clause 73 AN pages. The system permits rate negotiation without the need for the extra complexity of supporting AN pages and its associated state machine. The system is appropriate for both direct attach copper cables and optical modules, and more amenable to transceivers without the built-in capability to send or receive AN pages. One disadvantage of not using AN pages is that the capability is given up for negotiating functions not related to signal rate and format.

Figure 5:
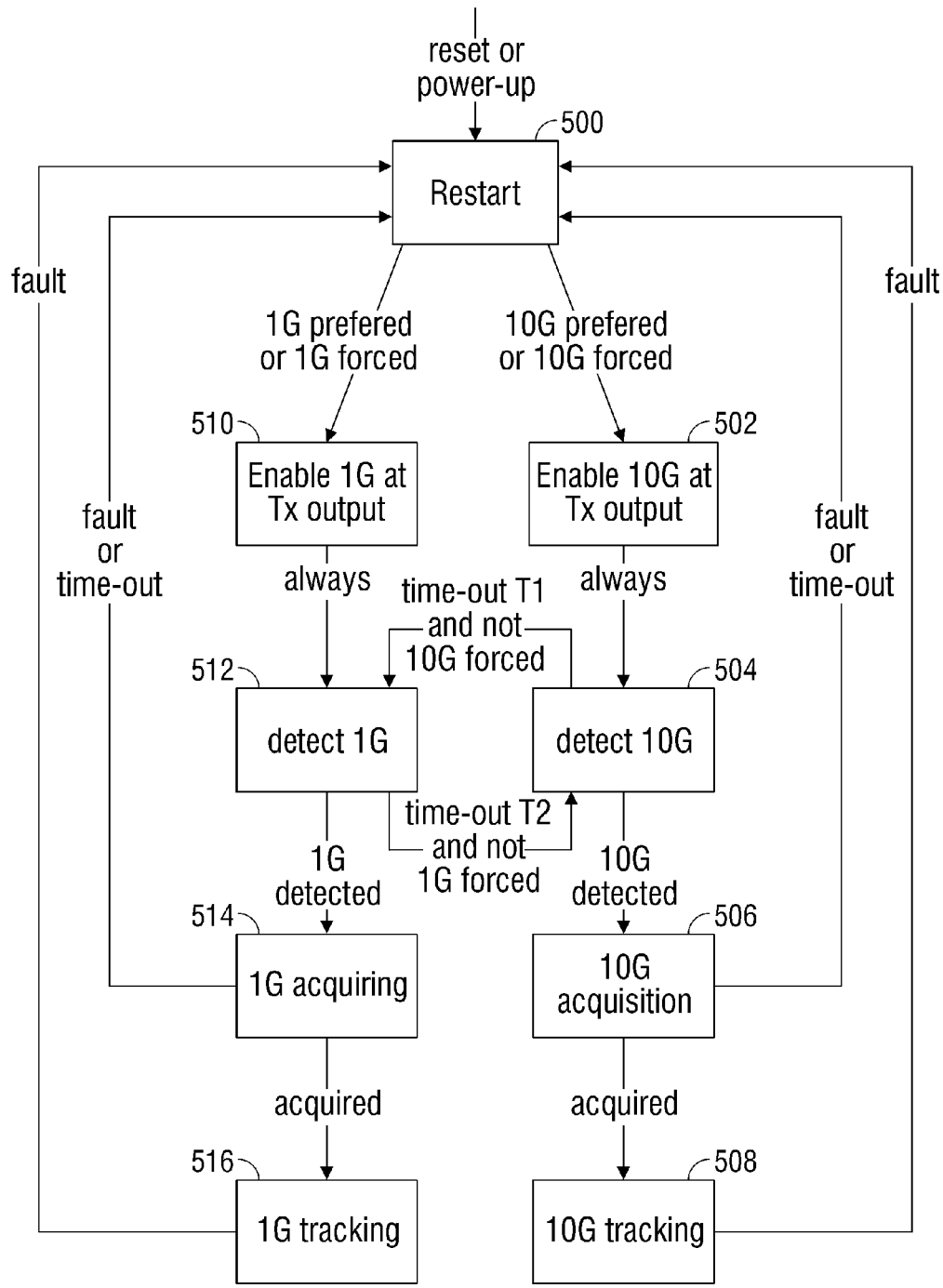
FIG. 5 is a state diagram for a universal auto-negotiation network without AN signals.

FIG. 5 is a state diagram for a universal auto-negotiation network without AN signals. This state machine demonstrates the steps involved in rate negotiation for SFP+ copper cable or optical applications without special negotiation signals (e.g., Clause 73 AN). Following power-up, reset, or link fault the process Is restarted 500. Optionally, the Tx driver is disabled for a predetermined period of time. This restart synchronizes both transceivers to the beginning of the negotiation process. This step is not always required, but is nevertheless a good way to align the timers and maximize timing margins and/or reduce wait times. After restart, if 10 G is preferred, the Tx output is enabled sending a valid 10 G 64B/66B signal (502). If a 10 G signal is detected (504) within time T1, then 10 G acquisition begins (506), followed by 10 G tracking (508). Otherwise an attempt is made to detect a 1 G signal (512).

After restart (500), if 1 G is preferred, the Tx output is enabled sending a valid 8B/10B signal (510). If a 1 G signal is detected within time T2, then 1 G acquisition begins (514), followed by 1 G tracking (516). Otherwise, an attempt is made to detect a 10 G signal (504).

If 10 G acquisition (506) does not complete within a predetermined period of time, or 1 G acquisition (514) does not complete within a predetermined period of time, or if a fault is detected while tracking or acquiring, the state machine restarts (500).

By setting T2 sufficiently larger than T1, simultaneous preference for 1 G and 10 G will resolve to 1 G at both ends, since the end that prefers 10 G will go (first) to the 1 G detect mode. Conversely, by setting T1 sufficiently larger than T2, simultaneous preference for 1 G and 10 G will resolve to 10 G at both ends, since the end that prefers 1 G will go (first) to the 10 G detect mode.

FIG. 6 is a table summarizing exemplary rate negotiation criteria. In one aspect (not shown), the three technology ability bits from Clause 73 may be re-defined to indicate the desired criteria. For example, A0 and A2 may indicate ability to support 1 G and 10 G, respectively. Then, A1 can be used to indicate preference for 1 G (1) or 10 G (0). Alternately, the bit positions and values may be assigned different meanings. An example of how bits A0, A1, and A2 may be used to indicate supported rates and preferences as shown in the table.

Note that any 3 bits may be employed to indicate the above supported rate scenarios.

FIG. 7 is a table illustrating an example of how the negotiated rate may be Indicated using the negotiated rate bits in the Backplane Ethernet Status register (7.48) (prior art). Bits 3:1 may be used as follows:

000b: link rate not negotiated;

100b: link negotiated to 10 G; and,

001b: link negotiated to 1 G.

Note that this definition is consistent with prior art 802.3ap Clause 72 and that alternatively any two bits may be used to indicate the negotiated status.

FIG. 8 is a table summarizing the expected negotiated rate, based on the criteria set at each PHY, along with the actual negotiated rate result.

Figure 9:
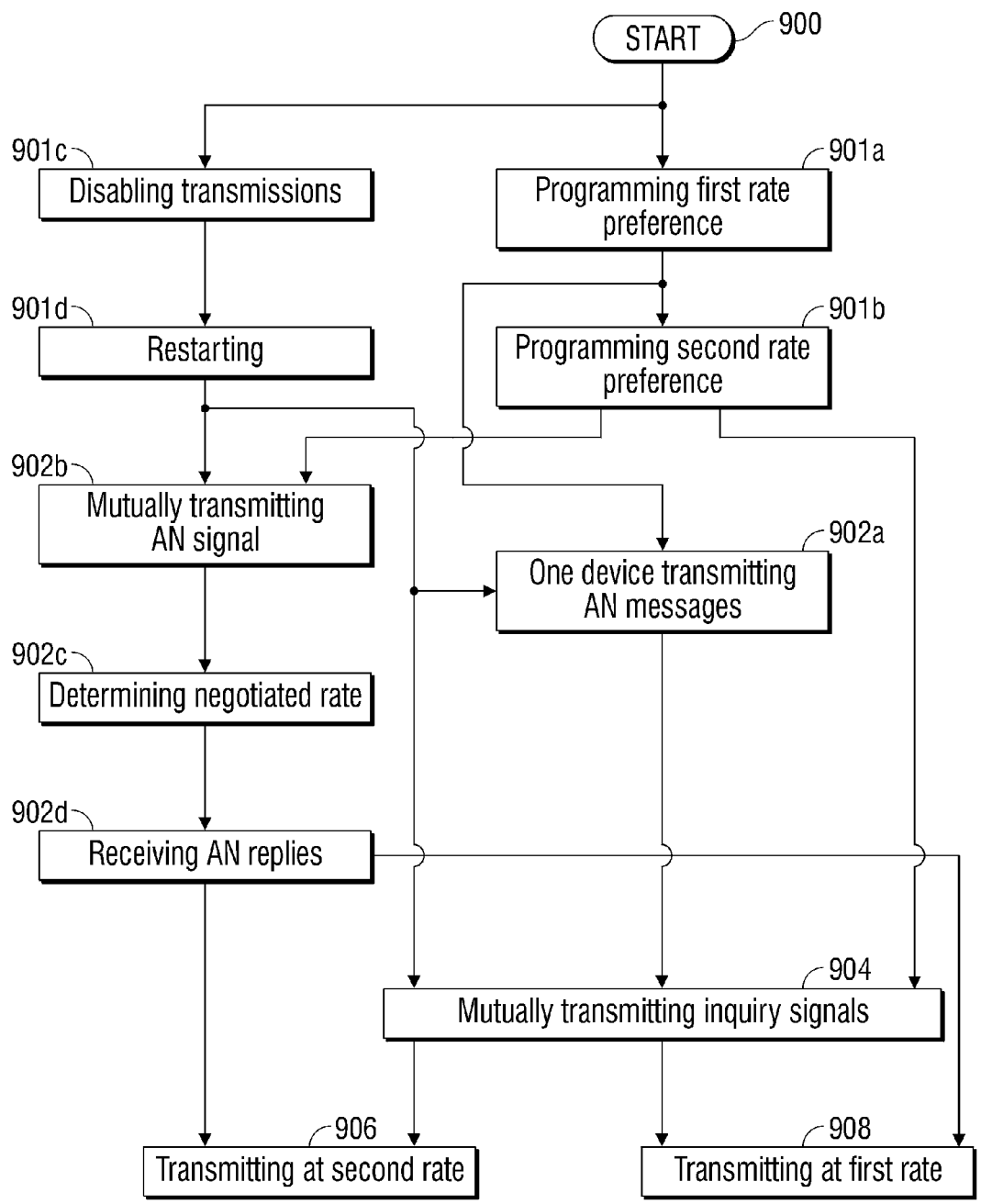
FIG. 9 is a flowchart illustrating a method for negotiating a link data rate in a communication system using a plurality of data rates.

FIG. 9 is a flowchart illustrating a method for negotiating a link data rate in a communication system using a plurality of data rates. Although the method, is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 900.

In a system, including a first device net work-connected to a second device, Step 904 mutually transmits predetermined inquiry signals in the event that a negotiated data rate has not been determined. The first device transmits the inquiry signal at a first data rate and the second device transmits the inquiry signal at a second data rate. In the event of the second device receives an acknowledgement signal at the second data rate, the first and second devices transmit non-predetermined data at, the second data rate in Step 906. In the event of the first device receives an acknowledgement signal at the first data rate, the first and second devices transmit non-predetermined data at the first data rate in Step 908. In one aspect, non-predetermined Ethernet data is transmitted at a first data rate of 10 G, and non-predetermined Ethernet data is transmitted at a second date rate of 1 G.

In one aspect, prior to mutually transmitting inquiry signals in Step 904, the first device transmits an AN message In Step 902*a*. The AN message indicates rate information such as preferred data rate capabilities and single data rate capabilities. Then, mutually transmitting inquiry signals in Step 904 includes mutually transmitting inquiry signals in response to the first device not receiving an AN message from, the second device. As an alternative, the first and second devices transmit non-predetermined data at the second rate (Step 906) because the first device receives inquiry signals at the second data rate from the second device. Then, the first device times-out, and the first device transmits at the second data rate.

In another aspect, Step 901*a* programs the first device, which is capable of transmitting at the first and second data rates, with a first data rate preference. Step 901*b* programs the second device, which is also capable of transmitting at the first and second data rate, with a second data rate preference. Then, mutually transmitting predetermined inquiry signals in Step 904 includes the first device transmitting the inquiry signal at the first data rate, and the second device transmitting the Inquiry signal at a second data rate. In Step 906 the first and second devices transmit non-predetermined data at the second rate in response to the first device timing-out before the second device, where timing-out is defined as not, receiving an expected transmission within a predetermined duration of time.

In another aspect, a first time-out duration is associated with the first data rate, and a system default second time-out duration, greater than the first time-out duration, is associated with the second data rate. Then, mutually transmitting predetermined inquiry signals in Step 904 includes the first device transmitting the inquiry signal at the first data rate, and the second device transmitting the inquiry signal at a second data rate. The first and second devices transmit non-predetermined data at the second rate (Step 906) in response to the first device timing-out before the second, device.

In another variation the first and second devices transmitting non-predetermined data at the first data rate (Step 908) includes the second device being capable of transmitting at the first and second data rates, but not receiving an acknowledgement signal at the second data rate from a first device only capable of transmitting at the first data rate. In this circumstance, the second device times-out and begins transmissions at the first rate. Otherwise, the first and second devices may transmit non-predetermined data at the second data rate (Step 908) because the first device, capable of transmitting at the first and second data rates, does not receive an acknowledgement signal at the first data rate from a second device, as the second device is only capable of transmitting at the second data rate. In this circumstance, the first device times-out and begins transmissions at the second data rate.

In another aspect, in Step 901*c* the first device disables further transmissions for a predetermined period of time in response to a device reset or management intervention. In response to the lack of received transmissions, the second device restarts and disables transmissions for a predetermined duration of time in Step 901*d*. Following the restart, the first and second devices mutually transmit inquiry signals (Step 904) if a negotiated data rate has not been determined (Step 902*c* and 902*d*).

In a different aspect, Step 902*b* mutually transmits AN messages indicating rate information such as preferred data rate capabilities and single rate capabilities, prior to mutually transmitting Inquiry signals (Step 904). In Step 902*c*, each device unilaterally determines a common negotiated data rate in response to evaluating their own data rate capabilities and received rate capabilities. Step 902*d* mutually receives AN replies indicating a successful negotiation. Then, transmitting non-predetermined data between the first and second devices in Step 906 or 908 includes transmitting non-predetermined data at the negotiated data rate.

In one aspect, transmitting the AN messages in Step 902*b* includes transmitting an AN message in accordance with either an IEEE 802.3ap Clause 73 protocol or an 802.3 Clause 37 protocol, with a message indicating compatibility with a proprietary negotiation protocol. Then, receiving AN replies in Step 902*d* includes receiving a message indicating compliance with the proprietary negotiation protocol. For example, the proprietary protocol may include all, or some of the steps presented in the explanation of FIG. 9.

The first and second devices not receiving an acknowledgement signals in Step 908 and 908 may be a result of CDR systems in the devices failing to lock to received signals. Likewise, first and second devices transmitting non-predetermined data may be a result of the CDR systems In the first and second devices locking to received signals.

Figure 10:
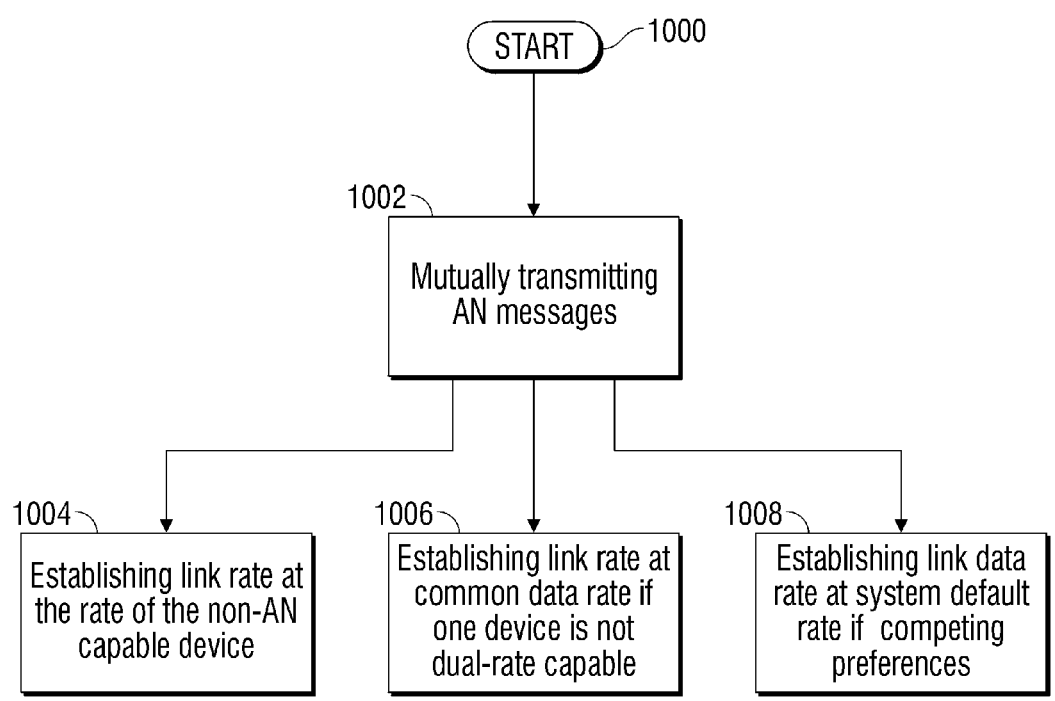
FIG. 10 is a state diagram illustrating a method for negotiating a link data rate in a communication system using a plurality of data rates.

FIG. 10 is a state diagram illustrating a method for negotiating a link data rate in a communication system using a plurality of data rates. The method starts at State 1000. In a system including a first device network-connected to a second device, State 1002 mutually transmits AN messages indicating rate information such as preferred data rate capabilities and single data rate capabilities, and State 1002 establishes a negotiated link data rate. In the event that the second device cannot send AN messages, the first device times-out, and State 1004 establishes a link data rate at the data rate transmitted by the second device.

In the event that only one of the devices is capable of transmitting at two data rates, State 1006 establishes a link data rate at a data rate common to both devices. In the event that both of the devices are capable of transmitting at two data rates and the devices have different preferred data rates. State 1008 establishes a link data rate at a system default preferred data rate.

A system and method for negotiating a link data rate have been, provided. Examples, of particular circuitry and process flows have been given, to illustrate the invention. However, the invention is not limited to merely these examples. Likewise, examples have been given in the context of an Ethernet protocol and particular data rates. Again the invention is not limited to these examples. Other variations and embodiments of the Invention will occur to those skilled in the art.

We claim:

1. In a communication system using a plurality of data rates, a method for negotiating a link data rate, the method comprising:

in a system including a first device network-connected to a second device, and prior to mutually transmitting inquiry signals, the first device transmitting an auto-negotiation (AN) message indicating rate information selected from a group consisting of preferred data rate capabilities and single data rate capabilities;

mutually transmitting predetermined inquiry signals in response to the first device not receiving an AN message from the second device, with the first device transmitting the inquiry signal at a first data rate and the second device transmitting the inquiry signal at a second data rate;

in the event of the second device receiving an acknowledgement signal at the second data rate, the first and second devices transmitting non-predetermined data at the second data rate;

in the event of the first device receiving an acknowledgement signal at the first data rate, the first and second devices transmitting non-predetermined data at the first data rate;

wherein the first and second devices transmitting non-predetermined data at the first data rate includes first and second devices transmitting non-predetermined Ethernet data at a 10 gigabit per second (10 G) data rate; and, wherein the first and second devices transmitting non-predetermined data at the second data rate includes first and second devices transmitting non-predetermined Ethernet data at a 1 gigabit per second (1 G) data rate.

2. The method of claim 1 further comprising:

programming the first device, capable of transmitting at the first and second data rates, with a first data rate preference;

programming the second device, capable of transmitting at the first and second data rate, with a second data rate preference; and, wherein the first and second devices transmitting non-predetermined data at the second rate includes the first and second devices transmitting non-predetermined data at the second rate in response to the first device timing-out before the second device, where timing-out is defined as not receiving an expected transmission within a predetermined duration of time.

3. The method of claim 2 wherein a first time-out duration is associated with the first data rate, and a system default second time-out duration, greater than the first time-out duration, is associated with the second data rate; and, wherein the first and second devices transmitting non-predetermined data at the second rate includes the first and second devices transmitting at the second data rate in response to the first device timing-out before the second device.

4. The method of claim 1 wherein the first and second devices transmitting non-predetermined data at the first data rate includes a second device, capable of transmitting at the first and second data rates, not receiving an acknowledgement signal at the second data rate from a first device only capable of transmitting at the first data rate, and the second, device timing-out; and, wherein the first and second devices transmitting non-predetermined data at the second data rate includes a first device, capable of transmitting at the first and second data rates, not receiving an acknowledgement signal at the first data rate from a second device only capable of transmitting at the second data rate, and the first device timing-out.

5. The method of claim 4 wherein the first and second devices transmitting non-predetermined data at the second rate includes the first device receiving inquiry signals at the second data rate from the second device, the first device timing-out, and the first device transmitting at the second data rate.

6. The method of claim 4 wherein the first and second devices not receiving an acknowledgement signal includes a clock and data recovery (CDR) system in the devices failing to lock to received signals; and, wherein the first and second devices transmitting non-predetermined data includes the CDR systems in the first and second devices locking to received signals.

7. The method of claim 1 further comprising:

in response to a condition selected from a group consisting of a device reset and a management intervention, the first device disabling further transmissions for a predetermined period of time;

in response to the lack of received transmissions, the second device restarting and disabling transmissions for a predetermined duration of time; and, following the restart, the first and second devices mutually transmitting inquiry signals if a negotiated data rate has not been determined.

8. The method of claim 1 further comprising:

prior to mutually transmitting inquiry signals, mutually transmitting AN messages indicating rate information selected from a group consisting of preferred data rate capabilities and single data rate capabilities;

each device unilaterally determining a common negotiated data rate in response to evaluating their own data rate capabilities and received rate capabilities;

mutually receiving AN replies indicating a successful negotiation; and, wherein transmitting non-predetermined data between the first and second devices includes transmitting non-predetermined data at the negotiated data rate.

9. The method of claim 8 wherein transmitting the AN messages includes transmitting an AN message in accordance with a protocol selected from a group consisting of IEEE 802.3ap Clause 73 and 802.3 Clause 37 protocols, with a message indicating compatibility with a proprietary negotiation protocol; and, wherein receiving AN replies Includes receiving a message indicating compliance with the proprietary negotiation protocol.

10. In a communication network using a plurality of data rates, a system for negotiating a link data rate, the system comprising:

a first device with a transceiver interfaced to a rate negotiation module;

a second device with a transceiver interfaced to a rate negotiation module and network-connected to the first device transceiver;

wherein the rate negotiation modules of the first and second devices mutually order the transmission of predetermined inquiry signals in the event that a negotiated data rate has not been determined, with the first device transmitting the inquiry signal at a first data rate and the second device transmitting the inquiry signal at a second data rate;

wherein the first and second device rate negotiation modules order the transmission of non-predetermined data at the second data rate if the second device receives an acknowledgement signal from the first device at the second data rate;

wherein the first and second device rate negotiation modules order the transmission of non-predetermined data at the first data rate in the event of the first device receives an acknowledgement signal from the second device at the first data rate;

wherein the first and second devices transmit non-predetermined Ethernet data at a first data rate of 10 gigabit per second (10 G) and at a second data rate of 1 G;

wherein the rate negotiation module of the first device, prior to the mutually transmission of inquiry signals, orders the transmission an auto-negotiation (AN) message indicating rate information selected from a group consisting of preferred data rate capabilities and single data rate capabilities; and, wherein the rate negotiation modules of the first and second devices mutually order the transmission of inquiry signals in response to the first device not receiving an AN message from the second device.

11. The system of claim 10 wherein the first and second device transceivers are capable of transceiving at both the first and second data rates;

wherein, the first device rate negotiation module has a control Interface for selecting the first data rate preference;

wherein the second device rate negotiation module has a control interface for selecting the second data rate preference;

wherein the rate negotiation modules of the first and second devices order the transmission of non-predetermined data at the second rate in response to the first device timing-out before the second device, where timing-out is defined as not receiving an expected transmission within a predetermined duration of time.

12. The system of claim 11 wherein a first time-out duration is associated with the first, data rate, and a system default second time-out duration, greater than the first time-out duration, is associated with the second data rate; and, wherein, the rate negotiation modules of the first and second devices order the transmission of non-predetermined data at the second rate in response to the first device timing-out before the second device.

13. The system of claim 10 wherein the rate negotiation modules of the first and second devices order the transmission of non-predetermined data at the first rate in response to the second device, capable of transceiving at the first and second data rates, not receiving an acknowledgement signal at the second data rate from the first device only capable of transmitting at the first data rate, and the second device timing-out; and, wherein the rate negotiation modules of the first and second devices order the transmission of non-predetermined data at the second data rate in response to the first device, capable of transmitting at the first and second data rates, not receiving an acknowledgement signal at the first data rate from a second device only capable of transmitting at the second data rate, and the first device timing-out.

14. The system of claim 13 wherein the first and second device transceivers include clock and data recovery (CDR) systems; and, wherein the first and second device transceivers fail to receive an acknowledgement signal in response to the CDR system falling to lock to received signals, and successfully receive acknowledgement signals in response to the CDR systems locking on received signals.

15. The system of claim 10 wherein the first device disables further transmissions for a predetermined period of time in response to a condition selected from a group consisting of a device reset and a management intervention message received at a control interface;

wherein the rate negotiation module of the second device orders the restarting and disabling transmissions for a pre-determined duration of time in response to the lack of received transmissions from the first device; and, wherein, the rate negotiation modules of the first and second devices mutually order the transmission of Inquiry signals, following the restart, if a negotiated data rate has not been determined.

16. The system of claim 10 wherein the rate negotiation modules of the first and second devices, prior to mutually transmitting inquiry signals, mutually order the transmission of AN messages indicating rate information selected from a group consisting of preferred data rate capabilities and single data rate capabilities;

wherein the rate negotiation modules of each device unilaterally determine a common negotiated rate from evaluating their own data rate capabilities and received rate capabilities;

wherein first and second devices mutually receive AN replies indicating a successful negotiation, and the rate negotiation modules order the transmission of non-predetermined data at the negotiated data rate.

17. The system of claim 16 wherein the first and second devices transmit AN messages in accordance with a protocol selected from, a group consisting of IEEE 802.3ap Clause 73 and 802.3 Clause 37 protocols, and further Include a message Indicating compatibility with a proprietary negotiation protocol; and, wherein the first and second devices receive AN replies indicating compliance with the proprietary negotiation protocol.

18. The system of claim 10 wherein the rate negotiation module of the first device, prior to the mutually transmission of inquiry signals, orders the transmission an AN message indicating rate information selected from a group consisting of preferred data rate capabilities and single data rate capabilities;

wherein the rate negotiation module of the first device times-out after not receiving an AN message; and, wherein the rate negotiation modules of the first and second devices transmit at the second data rate.

19. In a communication system using a plurality of data rates, a method for negotiating a link data rate, the method comprising:

in a system including a first device network-connected to a second device, programming the first device, capable of transmitting at the first and second data rates, with a first data rate preference;

programming the second device, capable of transmitting at the first and second data rate, with a second data rate preference;

mutually transmitting predetermined inquiry signals in the event that a negotiated data rate has not been determined, with the first device transmitting the inquiry signal at a first data rate and the second device transmitting the inquiry signal at a second data rate, in response to the first device timing-out before the second device, where timing-out is defined as not receiving an expected transmission within a predetermined duration of time, the first and second devices transmitting non-predetermined data at the second data rate;

in the event of the first device receiving an acknowledgement signal at the first data rate, the first and second devices transmitting non-predetermined data at the first data rate;

wherein the first and second devices transmitting non-predetermined data at the first data rate includes first and second devices transmitting non-predetermined Ethernet data at a 10 gigabit per second (10 G) data rate; and, wherein the first and second devices transmitting non-predetermined data at the second data rate includes first and second devices transmitting non-predetermined Ethernet data at a 1 gigabit per second (1 G) data rate.

20. In a communication network using a plurality of data rates, a system for negotiating a link data rate, the system comprising:

a first device with a transceiver, capable of transceiving at both a first data rate and a second data rate, and interfaced to a rate negotiation module with a control interface for selecting a first data rate preference;

a second device with a transceiver, capable of transceiving at both the first and second data rates to the network-connected the first device transceiver, and interfaced to a rate negotiation module with a control interface for selecting a second data rate preference;

wherein the rate negotiation modules of the first and second devices mutually order the transmission of predetermined inquiry signals in the event that a negotiated data rate has not been determined, with the first device transmitting the inquiry signal at the first data rate and the second device transmitting the inquiry signal at the second data rate;

wherein the first and second device rate negotiation modules order the transmission of non-predetermined data at the second data rate if the second device receives an acknowledgement signal from the first device at the second data rate;

wherein the first and second device rate negotiation modules order the transmission of non-predetermined data at the first data rate in the event of the first device receives an acknowledgement signal from the second device at the first data rate;

wherein the rate negotiation modules of the first and second devices order the transmission of non-predetermined data at the second rate in response to the first device timing-out before the second device, where timing-out is defined as not receiving an expected transmission within a predetermined duration of time; and, wherein the first and second devices transmit non-predetermined Ethernet data at a first data rate of 10 gigabit per second (10 G) and at a second data rate of 1 G.

* * * * *